Figures 1, 2, 3:
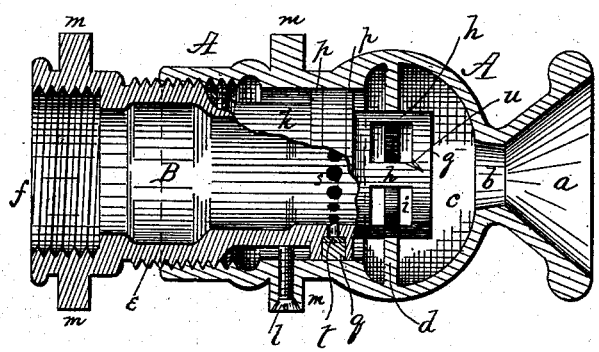

(No Model.)

F. W. ROBERTSHAW.
HOSE NOZZLE.

No. 261,957. Patented Aug. 1, 1882.

WITNESSES:
T. J. Patterson
Saml. Cunningham

Frederick W. Robertshaw, INVENTOR,
Connolly Bros & McTighe
ATTORNEYS

UNITED STATES PATENT OFFICE.

FREDERICK W. ROBERTSHAW, OF PITTSBURG, PENNSYLVANIA.

HOSE-NOZZLE.

SPECIFICATION forming part of Letters Patent No. 261,957, dated August 1, 1882.

Application filed February 21, 1882. (No model.)

*To all whom it may concern:*

Be it known that I, FREDERICK W. ROBERTSHAW, of Pittsburg, in the county of Allegheny and State of Pennsylvania, have invented certain new and useful Improvements in Hose-Nozzles; and I do hereby declare that the following is a full, clear, and exact description of the invention, which will enable others skilled in the art to which it appertains to make and use the same, reference being had to the accompanying drawings, which form a part of this specification, and in which—

Figure 1 is a longitudinal section of the complete nozzle. Fig. 2 is a view of the shell. Fig. 3 is a view of the hollow plug.

This invention relates to improvements in hose-nozzles; and it consists in the construction and combination of parts, substantially as hereinafter described and claimed.

In a pending application I have shown a nozzle having a regulating-valve closing the discharge-orifice, and devices for adjusting the valve to any desired opening, so as to throw various kinds of streams. There are, however, many uses for a nozzle which, while not affording facility for closing the orifice, yet may be regulated as to size of stream or quality thereof. To construct such a nozzle is my present aim, as well as to provide a more efficient spraying device and a more reliable packing between the movable parts.

A designates the nozzle or shell, which is substantially the shape of that described in my prior application, except that it is not provided at the mouth with a conical valve, which, with the conical seat there set forth, is for my present purposes not essential. The nozzle A has the divergent discharge $a$ and a slightly-convergent neck, $b$, leading thereto from the interior. The nozzle then takes the form of the expanded shell or chamber $c$, which has the inwardly-projecting flange or abutment $d$, circumferential as regards the axis of the nozzle A. The hollow plug B is threaded at $e$ to receive shell A, and is in turn threaded at $f$ to attach to the hose. Plug B has its main body hollow, as shown, but has the closed outer end, $g$, which is carried by two or more arms, $h$, leaving openings $i$ for the passage of the water outwardly into the chamber $c$. At this part plug B is cylindrical, and is made to fit with only moderate closeness the circular orifice in flange $d$. Shell or nozzle A is cylindrical at $k$, to allow movement on the plug B of the threaded part $e$, and is prevented from screwing off again by the set-screw $l$, which passes through one of the wrench-lugs or spanner-studs $m$, and meets the shoulder formed behind the packing-collar when the nozzle is unscrewed. Plug B, back of the openings $i$, is made with two collars or rings, $p$, and the trough thus formed is made to communicate with the interior of the plug by a series of holes, $s$. A flat metallic strip, $t$, is bent so as to set down between the collars $p$, and then the packing $q$ is placed outside the strip $t$. The pressure of the water through holes $s$ against strip $t$ causes it to press the packing $q$ outwardly against the cylindrical part $k$ of the nozzle, the pressure being uniformly distributed and preventing egress of water between shell A and plug B. The amount of water discharged is governed by the amount of exposure of openings $i$ on the discharge side of flange $d$; but the water cannot be entirely shut off. It may be reduced to a spray by unscrewing the shell A until the closed end $g$ of plug B has cut off the openings $i$ from the discharge side of flange $d$, when the water discharges through the small spiral notches $u$, cut or formed in the rear edges of the closed end $g$ of plug B. The water thus discharged spirally takes a whirling motion, which causes it to hug the internal surface of the discharge-orifice, and issue in the form of a fine spray.

I claim as my invention—

1. In a hose-nozzle, the combination of threaded shell A, having chamber $c$ and flange $d$, with threaded hollow plug B, having openings $i$ and closed end $g$, substantially as described.

2. In a hose-nozzle, the combination of shell A, having chamber $c$ and flange $d$, with the movable plug B, having openings $i$, closed end $g$, and spiral notches $u$, substantially as described.

3. In a hose-nozzle, the combination, with shell A, of the movable hollow plug B, having holes s, collars p, ring or strip t, and packing q, substantially as described.

4. The combination of threaded shell A and set-screw l with plug B, having cylindrical portion k and collar p, substantially as described.

In testimony that I claim the foregoing as my own I have hereto affixed my signature in presence of two witnesses.

FREDERICK W. ROBERTSHAW.

Witnesses:
D. E. DAVIS,
JOSEPH PATTERSON.